G. H. DAY.
OPHTHALMIC MOUNTING.
APPLICATION FILED DEC. 26, 1917.
1,343,437.
Patented June 15, 1920.
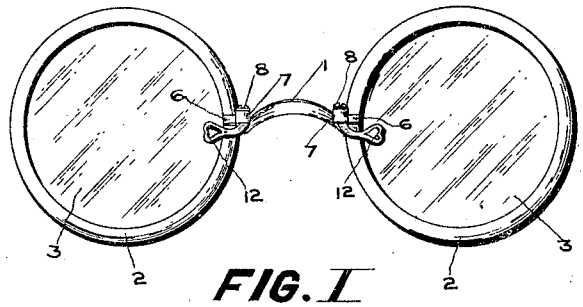
FIG. I
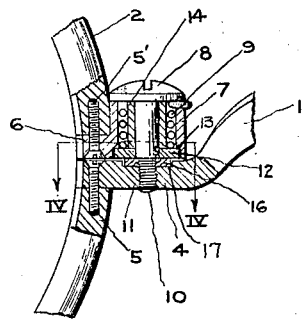
FIG. II
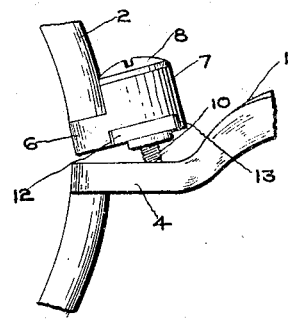
FIG. III
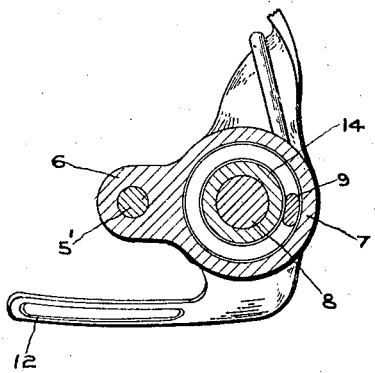
FIG. IV
INVENTOR
GEORGE H. DAY
BY
H. H. Styll  H. K. Parson
ATTORNEYS

UNITED STATES PATENT OFFICE.

GEORGE H. DAY, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

OPHTHALMIC MOUNTING.

1,343,437.      Specification of Letters Patent.      Patented June 15, 1920.

Application filed December 26, 1917. Serial No. 208,939.

*To all whom it may concern:*

Be it known that I, GEORGE H. DAY, a citizen of the United States, residing at Southbridge, in the county of Worcester and State of Massachusetts, have invented certain new and useful Improvements in Ophthalmic Mountings, of which the following is a specification.

This invention relates to new and useful improvements in ophthalmic mountings, and more particularly to a fingerpiece mounting, the main object of the invention being the provision of a fingerpiece mounting wherein the several parts, which include the pivot pin and the coil spring, are inclosed within a casing to prevent any dust or other particles from accumulating within the coils of the spring and thus interfering with the operation of the fingerpiece.

Another object of this invention is the provision of a fingerpiece mounting wherein the fingerpiece is mounted in close proximity to the lens frame so as to materially reduce the P. D., but at the same time is located in such a position as to permit of free swinging movement of the fingerpiece itself.

A further object of the invention is the provision of a fingerpiece mounting wherein a plurality of the parts which make up the pivot for the fingerpiece are disposed within a casing carried by a plate secured to one end of the lens frame and arranged in such a manner that upon unscrewing the pivot pin the lens can be quickly and readily removed from the frame without removing the fingerpiece from its pivot.

With the above and other objects in view the invention consists in the novel features of construction and combination and arrangement of parts hereinafter more fully set forth, pointed out in the claims and shown in the accompanying drawings, in which:

Figure I is an enlarged front elevation of a pair of eyeglasses constructed in accordance with my invention.

Fig. II is a longitudinal sectional view.

Fig. III is an enlarged elevation of the mounting illustrating how the lens can be removed from the frame without detaching the fingerpiece from its mounting.

Fig. IV is a transverse sectional view taken on the line IV—IV of Fig. II.

Referring now more particularly to the drawings accompanying this application, the numeral 1 indicates a nose bridge having attached to each end thereof the frames 2, in which the lenses 3 are mounted. The bridge 1 is provided at each end thereof with the lateral extensions 4 forming the usual seat for the fingerpiece. These outward extensions 4 are detachably connected to the frames 2 by means of the screws 5 which extend through the portions 4 adjacent their outer ends and are engaged within suitable openings within the ends of the frames 2, as clearly illustrated in Fig. II.

Arranged in opposed relation with the extensions 4 and detachably secured to the outer ends of the frames 2 are the plates 6, said plates being removably secured to the ends of the frames 2 by the screws 5'. These plates 6 have an extension which projects inwardly toward the nose piece 1 and is in the form of a cylindrical housing 7 forming a suitable housing to inclose the pivot pin 8 and the coil spring 9 to prevent dirt and other particles from accumulating at this point. Extending through the housing separately thereof and having their threaded ends 10 engaged within the threaded openings 11 in the extensions 4 are the pivot pins 8 which not only provide a pivot point for the fingerpieces 12 but detachably connect the plates 6 to the extensions 4 so that the frames 2 are readily engaged with the edges of the lenses which are placed therein.

It will be noted in Fig. II that the lower portions of the casing 7 are each provided within their walls with a suitable cavity 13 to receive the arm of the fingerpiece 12, said cavity being sufficiently large to provide of a free swinging movement of the fingerpiece. An inner housing or casing 14 is provided for each one of the pivot pins 8 and the lower end thereof is disposed between the pivot pin and the walls of the bearing opening within the fingerpieces, and mounted upon this casing and encircling the same is a coil spring 9, one end of which is attached to the fingerpiece while the other end thereof is attached to the casing, to normally place the end of the fingerpiece under tension.

In order to retain the arm of the fingerpiece upon the pin 8 in its pivotal position, I provide a nut 16 for each one of the pivot pins which are arranged within the cavity 17 formed in the upper faces of the extensions 4 of the nose bridge, so that when the screws 8 are unthreaded from the openings 11 the ends of the frames may be separated to remove the lenses therefrom without interfering with the operative positions of the fingerpieces. In assembling my improved fingerpiece mounting, the pivot pin 8 and corresponding casing 14 are arranged within the housing 7. The coil spring 9 is then placed over the casing 14 and arranged between the walls of the housing and the casing. The arm of the fingerpiece is then mounted upon the outer end of the casing 14 and the nut 16 threaded on the end 10 of the pivot pin 8 to retain this arm in position. It will be understood, however, that this nut is not tightened upon the threaded portion of the spring to its fullest extent until after the pivot pin has been threaded into the opening 11 in the bridge seat 4. After the nut 16 has been placed in position, the threaded end 10 of the pin 8 is then engaged within the opening 11 of the bridge seat, whereby turning movement of the screw 8 will bring the ends of the frame together to securely retain the lens in position therein. It will be understood that the nut 16 is not tightened to its fullest extent when first placed upon the pin 8 but is loose enough to permit of turning movement of this pin so that the same can be easily threaded into the opening 11 in the bridge seat and as the outer surface of the nut is circumferential, the same will readily turn after being disposed within the cavity 17 until the lower face thereof contacts with the bottom of the cavity, when the friction between the meeting faces of the nut and the cavity will tend to have the screw 8 tighten into the nut and the bridge seat 4 whereby both of these parts will be securely tightened upon the threaded end of the pin 8. When it is desired to disengage the ends of the frame, the pin 8 is turned until the threaded end thereof is released from the opening 11 sufficiently to disengage the nut 16 from the cavity whereby the pin and nut will then turn together so as to retain the fingerpiece arm, springs, and casing within the housing 7 while at the same time the pin 8 will be readily disengaged from the bridge seat 4.

From the above description taken in connection with the drawings accompanying the application it will be noted that I have provided a simple and durable fingerpiece mounting, wherein the several operative parts thereof are inclosed within a housing or casing to prevent the accumulation of dust and other particles so as not to interfere with the operation of the fingerpieces. It will also be noted that the lenses 3 may be quickly and readily arranged within the frames or removed therefrom without interfering with the position of the fingerpieces, as the screw members 8 can be quickly and readily detached from the extensions 4 so as to provide for separation of the ends of the frames and permit of the ready removal or insertion of the lenses.

I claim:

1. A mounting of the class described, including a support, a pivot pin carried thereby, a housing inclosing the pin, having an aperture therein, a casing within the housing and mounted upon the pin, a fingerpiece extending through the aperture and mounted upon the casing, a nut threaded on the pin for retaining the fingerpiece and a coil spring on the casing having one end secured to the housing and the other end secured to the fingerpiece to normally retain the same under tension.

2. A device of the class described, including a supporting member, a split ring having one end detachably connected to the supporting member, a plate detachably connected to the other end of the ring, a spring actuated fingerpiece carried by the plate and means whereby the plate is detachably connected to the support, as and for the purpose set forth.

3. A device of the class described, including a supporting member, a split ring having one end detachably connected to the supporting member, a plate detachably connected to the other end of the ring and arranged in opposed relation to the support, a housing on the plate having an aperture, a pivot pin extending through the housing and detachably connected to the support, and a spring actuated fingerpiece extending through the aperture, as and for the purpose set forth.

4. A device of the class described, including a support, a split ring having one end detachably connected to the support, a plate carried by the other end thereof, a housing on the plate having a circumferential cavity, said support having an aperture arranged therein beneath the housing, a pivot pin in the housing and detachably connected with the support, a spring actuated fingerpiece extending through the cavity in the housing, and a nut threaded on the pin to retain the fingerpiece in place, as and for the purpose set forth.

5. A device of the class described, including a support, a housing adjacent the support having an aperture therein, a pivot pin extending through the housing and detachably engaged with the support, a fingerpiece arranged within the aperture, a coil spring in the housing surrounding the pin, having one end secured to the housing and the other end secured to the fingerpiece, and a nut threaded on the pin adjacent the fingerpiece to retain the same in position as and for the purpose set forth.

6. A device of the class described, including a support, a housing adjacent the support having an aperture therein, a pivot pin extending through the housing and detachably engaged with the support, a casing surrounding the pin, a spring actuated fingerpiece on the casing and arranged in the aperture in the housing, and a nut threaded on the pin adjacent the fingerpiece, as and for the purpose set forth.

7. A device of the class described, including a support, a split ring, a housing carried by one end of said ring, a spring actuated fingerpiece carried by the housing, and means for detachably connecting the ends of the ring to the support.

8. An ophthalmic mounting including a bridge seat, a frame having one end connected thereto, a plate carried by the other end of the frame, a pivot screw extending through the plate for securing the same to the bridge, a lock nut on the screw above the bridge for securing the lever, bridge and pivot together, whereby the pivot may be rotated as desired to secure or loosen the bridge and plate and the remaining parts to be secured in assembled relation.

9. A device of the class described including a split ring, a support on one end of the ring, a housing on the opposite end of the ring, a spring actuated guard lever carried by the housing, and means for securing the ring in closed position.

10. In an ophthalmic mounting, the combination with a split ring or frame member, of a lateral projection carried by one end of the frame member, a housing carried by the other end of the frame member, a spring actuated lever pivotally secured to the housing, means in the housing for actuating the lever, and means for connecting the housing and ring projection to secure the split ring in closed position.

In testimony whereof I have affixed my signature, in presence of two witnesses.

GEORGE H. DAY.

Witnesses:
Wm. P. Chase,
William B. Jones.